(No Model.)

T. MANN.
LIVE BOX FOR SHELL FISH.

No. 517,652. Patented Apr. 3, 1894.

WITNESSES:—
L. Ismy Van Horn.
Alvan Macauley

INVENTOR:—
Thomas Mann
By
Chas. B. Mann
ATTORNEY.

UNITED STATES PATENT OFFICE.

THOMAS MANN, OF BALTIMORE, MARYLAND.

LIVE-BOX FOR SHELL-FISH.

SPECIFICATION forming part of Letters Patent No. 517,652, dated April 3, 1894.

Application filed December 19, 1893. Serial No. 494,107. (No model.)

*To all whom it may concern:*

Be it known that I, THOMAS MANN, a citizen of the United States, residing at Baltimore, in the State of Maryland, have invented certain new and useful Improvements in Live-Boxes for Shell-Fish, of which the following is a specification.

My invention relates to an improvement in that class of devices that are used for preserving in their live state oysters, crabs, and shell fish of all kinds.

Figure 1:
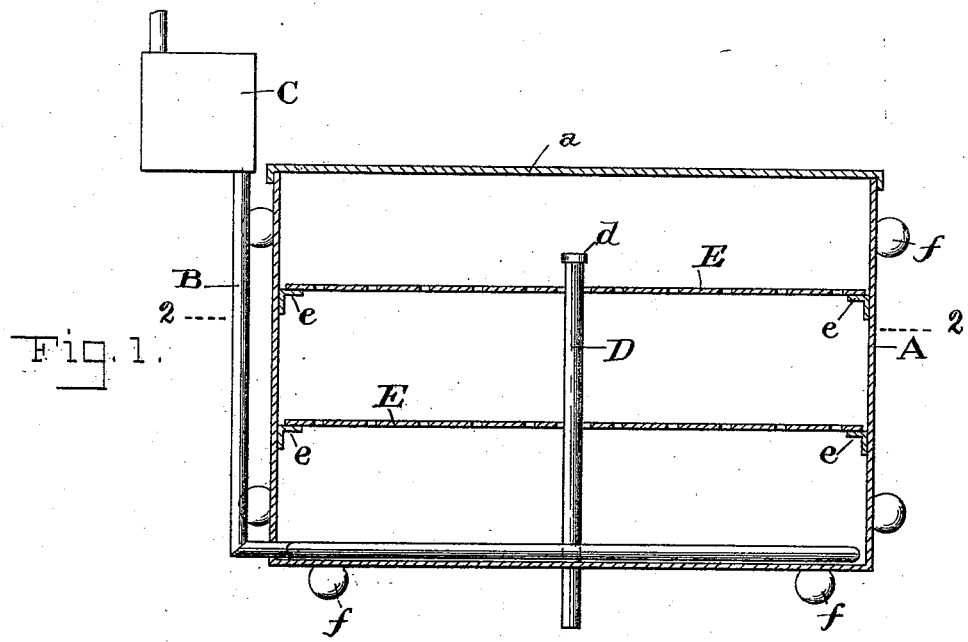
Figure 2:
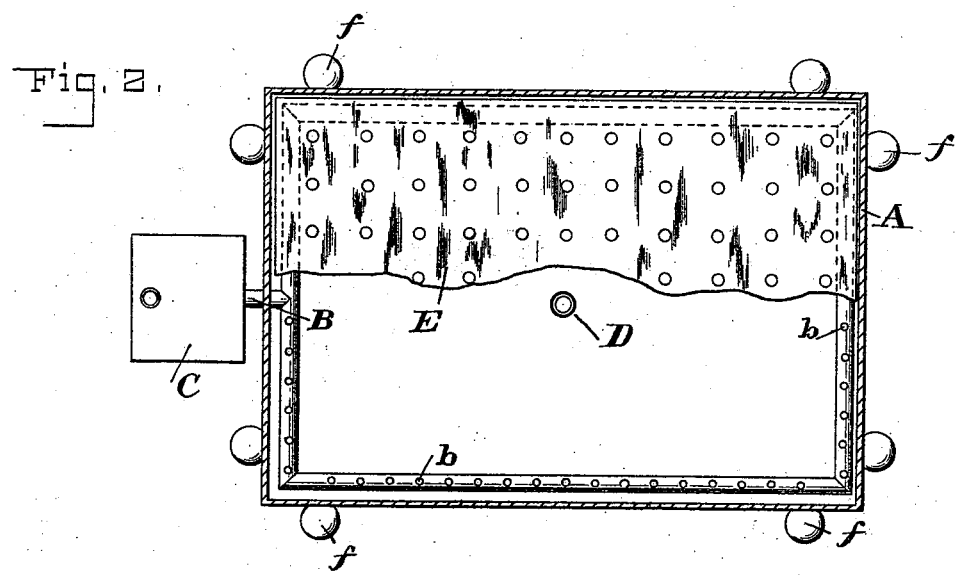

In the accompanying drawings in which the invention is illustrated Figure 1 is a vertical section of the device. Fig. 2 is a section on the line 2—2 of Fig. 1.

Referring to the drawings, the letter, A, indicates a closed water-tight box or casing having a cover, $a$. A feed-pipe, B, enters the box at or near the bottom thereof and extends around the edges, as shown in the drawings, in the form of a rectangle. But this particular form is immaterial, the essential feature being that it should follow substantially the inside form of the box, which may vary to suit any particular need. Within the box the feed-pipe is provided with a number of jet apertures, $b$, for a purpose to be presently described. At some convenient point on the feed-pipe a receptacle, C, is provided and is designed to be filled with salt. The water as led from any convenient source to the box will percolate through the receptacle and will thereby become impregnated with the salt. If the shell-fish to be preserved be of a fresh-water variety the salt receptacle will not be used, nor will it be used when salt water is attainable, as the only object of the salt receptacle is to supply to the box as nearly the native element of the contained shell-fish as may be possible. The water from the feed-pipe will escape into the box through the jet orifices, $b$, and will leave the box through the upright overflow drain-pipe, D, which is provided with an entrance port, $d$, so as to keep the level of the water in the box at the desired height.

By having the feed-pipe, B, extended entirely around the inner walls of the box in the form of a square ring or continuous loop the salt-water from the salt receptacle, C, is insured a uniform distribution in the water contained in the box; this follows because the water feeds through the jet apertures, $b$, of the feed-pipe from all sides of the box simultaneously; also by locating the waste pipe, D, centrally with respect to the said square ring or loop, there will be a coaction between these parts, the waste water being drawn equally from all sides of the box.

Perforated shelves, E, are removably secured in the box on supports, $e$. These are for convenience in packing and unpacking the box and supporting the oysters.

It will be seen that my device comprises a simple, cheap and efficient means for storing for an indefinite time, and yet preserving in their normal and healthy condition, all kinds of sea food. The device will be found particularly valuable for storage during transportation.

It is a well-known fact that shocks or noises of different kinds produce ill-effects upon shell-fish, severe shocks sometimes killing them. Therefore to obviate all shock and jar during movement or shipment, I provide the device with a number of elastic cushions, $f$, in the form of balls, which may be arranged at different points on the exterior of the box at its bottom and sides.

Having thus described my invention, what I claim as new, and desire to secure by Letters Patent, is—

1. In a device of the class described, the combination of the water-tight box having perforated shelves arranged therein one above the other; a feed pipe entering the box at or near its bottom and on the inside extending around the inner walls of the box in a continuous loop-form and provided throughout its length with jet apertures; a salt receptacle exteriorly of the box and connected with the feed-pipe; and a drain-pipe extending vertically up through the box to a point above the top shelf and having position centrally with respect to the said continuous loop feed-pipe.

2. In a device of the class described, the combination of the closed water-tight box having perforated shelves arranged therein one above the other; a salt-water feed-pipe entering the box; a vertical overflow pipe; and elastic cushions, $f$, on the exterior of the box at its bottom and sides.

In testimony whereof I affix my signature in the presence of two witnesses.

THOMAS MANN.

Witnesses:
ALVAN MACAULEY,
W. H. READ.